United States Patent [19]

Smith et al.

[11] Patent Number: 5,108,085

[45] Date of Patent: Apr. 28, 1992

[54] APPARATUS AND METHOD FOR THE PRODUCTION OF FLEXIBLE PRODUCTS

[75] Inventors: David A. Smith, Midland; Herbert B. Geiger, Bay City, both of Mich.

[73] Assignee: The Dow Chemical Company, Midland, Mich.

[21] Appl. No.: 565,339

[22] Filed: Aug. 9, 1990

Related U.S. Application Data

[62] Division of Ser. No. 353,932, May 22, 1989.

[51] Int. Cl.$^5$ ............................................. B65H 29/32
[52] U.S. Cl. .................... 271/276; 271/195; 271/196; 271/309
[58] Field of Search ............... 271/276, 194, 195, 196, 271/309, 314, 82

[56] References Cited

U.S. PATENT DOCUMENTS

| | | | |
|---|---|---|---|
| 4,145,040 | 3/1979 | Huber | 271/196 X |
| 4,252,309 | 2/1981 | Garrison | 271/82 X |
| 4,588,184 | 5/1986 | Jeschke | 271/252 X |
| 4,911,423 | 3/1990 | Smith | 271/196 X |
| 4,919,415 | 4/1990 | Smith | 271/196 X |

Primary Examiner—Richard A. Schacher

[57] ABSTRACT

An apparatus and method for making individual flexible web products whereby a web material is tucked outwardly from the surface of a product drum by fixed projections, severed and sealed, and provided to one or more transfer points. The products are there transferred to one or more transfer drums with corresponding indentations, which deliver the products to packing devices. An alternative embodiment provides multiple delivery points by using lateral-shifting transfer drums. The apparatus and method vary and control flexible product width introducing a multiplicity of moving parts, and enhance separation of individual products during transfer while increasing overall production rates.

23 Claims, 7 Drawing Sheets

APPARATUS AND METHOD FOR THE PRODUCTION OF FLEXIBLE PRODUCTS

This is a division of application Ser. No. 353932, filed May 22, 1989.

CROSS-REFERENCE TO RELATED APPLICATIONS

This application is related to commonly assigned U.S. applications Ser. No. 200,283, filed May 31, 1988, now U.S. Pat. No. 4,911,423, issued Mar. 27, 1990, and Ser. No. 159,133 filed Feb. 23, 1988, now U.S. Pat. No. 4,919,415, issued Apr. 24, 1990.

BACKGROUND OF THE INVENTION

This invention relates to an apparatus and method for making individual flexible web products, and, in particular, to an apparatus and method for producing bags of different widths from a folded web of heat sealable thermoplastic material.

In the production of individual flexible web products such as plastic bags and containers, the bag stock is typically supplied in the form of a continuous web of thermoplastic material which has been folded upon itself to form two plies. In forming individual plastic bags and containers, portions of the thermoplastic material are severed from the web. These severed areas also become side seams for the bags because they are typically sealed at the same time as they are severed by the use of a heated wire element. The plastic bags are then stacked, counted, and packaged by packing equipment.

The severing and sealing operation typically takes places on a relatively large diameter rotating drum which may contain multiple heated wire severing and sealing elements positioned in grooves located within the outer periphery of the drum. See, for example, Tumminia U.S. Pat. No. 4,369,449, assigned to the same assignee as the present invention. As the drum rotates through a given arc, different severing and sealing elements are actuated and raised up to the drum surface to sever and seal a respective portion of the web of bag stock. The individual bags are retained on the drum by a vacuum arrangement as the drum rotates. Such drums are large and expensive pieces of equipment. However, they can presently be operated at production speeds in excess of the production speed of the packaging equipment.

Individual bags are then taken from the drum, stacked, and packaged. See, for example, U.S. Pat. Nos. 28,172, 3,254,889, 3,599,705, 3,640,050, and 3,842,568, for a description of typical stacking and packing apparatus. Desirably, the packaging operation occurs at the highest possible speed at which the equipment can be operated to increase productivity of the system. As shown in the above mentioned patents, presently, individual bags are taken from the drum by a smaller drum, also suitably equipped with vacuum capabilities. The vacuum on the bags on the large drum is relieved at an appropriate point, and the bags fall onto the smaller drum where they are held in position by vacuum. At an appropriate point, the vacuum is released and the individual bags are pulled off the smaller drum by an orbital packer or similar device.

Early rotary drum apparatuses provided for cutting bags at fixed intervals on a smooth drum, e.g. Allison, U.S. Pat. No. 2,737,859, permitting production of one bag size. Since then the versatility of bag making machines has been improved to permit the production of a variety of bag widths on one machine. Improvements in mass production rates have also been sought. The versatile machines disclosed in U.S. Pat. Nos. 3,901,754 and 4,331,502 use two sets of support rollers which separate and pull the web of thermoelastic material into a zig-zag shape before cutting and sealing along one set of supports. These machines permit continuous bag production at high rates and bag width can be adjusted by changing the separation between the two sets of support rollers. Their drawback, however, is that they have many moving parts.

The continuous bag making machines in U.S. Pat. Nos. 3,004,881, 4,198,259, and 3,971,299 loop thermoplastic web material between one set of supports, cutting and sealing the material at the supports. Versatility in bag size is achieved by varying the amount of material looped between the supports, or by cutting the material at every second or third support. The relative simplicity of these machines however, sacrifices precision in bag width.

Other inventions, such as U.S. Pat. Nos. 4,557,713 and 4,609,367, employ adjustable tuck bars to tuck the web material outwardly to various depths to change the bag width. Infinite variation of bag size is possible within dimensional limits of these machines. However, these adjustable tuck bars also have the drawback of many moving Parts, and precision in bag width continues to be of concern. Additionally, transfer and stacking problems occur with larger bag sizes due to instantaneous acceleration of the bags at the point of transfer between the product drum and transfer drum, a problem discussed in more detail below.

When the thermoplastic material is severed and sealed, the resulting bag seams remain hot even as the bags pass from the large drum to the transfer drum. Thus, when looped or tucked material is removed from the product drum and laid flat on the transfer drum, the bag seals may overlap and reweld. Typically, the solution has been, for example with U.S. Pat. No. 4,557,715 and 4,608,367, to increase the rotational speed of the transfer drum to create space between the bag seams on the transfer drum. However, because the transfer drum is required to rotate at a tangential velocity higher than that of the seal drum, the bags are subjected to instantaneous acceleration at the point of transfer. Transfer and stacking problems result, particularly with larger sized bags.

Also presenting bag sealing problems is the tendency of the thermoplastic material to melt back when cut by the hot sealing wires. It has been found that relieving tension in the thermoplastic web material permits the bag welds to seal more completely. Thus, means to provide such relief have been sought. For example, the adjustable tuck bars of U.S. Pat. Nos. 4,557,713 and 4,609,367 and supports of U.S. Pat. No. 4,331,502 retract slightly at the time of sealing to provide tension relief and improve the bag weld seal.

Thus, simple but versatile machines are still sought which can achieve high volume bag production while maintaining bag width precision and bag weld separation without attendant transfer and stacking problems.

SUMMARY OF THE INVENTION

The present invention meets those needs by providing a simple means to vary product width without introducing a multiplicity of moving parts and associated adjustment problems. According to one aspect of the Present invention, a folded web of thermoplastic material is continuously fed onto the surface of a rotatable product drum having a plurality of conventional sever and seal stations located about its outer periphery for forming individual bags. Positioned between adjacent sever and seal stations are means for tucking the web of material outwardly from the periphery of the product drum. In its first embodiment, the means for tucking are fixed projections on the surface of the product drum.

In another embodiment, the projections are of different discrete sizes and have means for attachment and detachment to the surface of the product drum. Alternatively, projections of a single size may be positioned by means of spacer blocks at various depths in a groove cut into the surface of the product drum to vary the height of the projection. Variation in size or height of the projection attached to the drum will permit an increase or decrease in the size of the tuck, thereby changing the size of the product formed on the product drum. This simplification of design reflects a recognition of the need for producing only certain discrete bag sizes and reverses the trend towards complexity of design. Moving parts are minimized, eliminating associated adjustment problems. The use of fixed projections further improves control of product width and results in greater product uniformity.

Also incorporated in the design of the projections is a means of providing simple tension relief in the web material during the severing and sealing operation, whereby a means of expanding the projections by mechanical, or alternatively and preferably, pneumatic force, is activated at the time the web is laid on the product drum, and then contracted prior to the severing and sealing operation. Following severing and sealing of the web material, the individual flexible Products are retained on the product drum by vacuum ports located on both sides of the projections.

The present invention also includes means for transferring individual ones of the products from the Product drum to a delivery point by means of a rotatable vacuum transfer drum having conventional means for vacuum retention of the flexible products on their leading edges by the first of two vacuum manifolds. The transfer drum has a series of indentations on its surface corresponding in depth with the projections on the product drum so that the indentations mate with the projections as the product and transfer drums rotate. In the preferred embodiment, the indentations removably receive inserts and spacer blocks of different discrete sizes to correspond with projections of different sizes and heights which may be attached to the product drum. The indentations include vacuum ports communicating with the second vacuum manifold securing the flexible products therein to prevent rewelding of adjacent bag seams while the transfer drum rotates through a given arc. Means for subsequently urging the individual products outwardly from the indentations prior to their reaching a delivery point preferably include fixed guides, which may also be combined with positive air pressure introduced through ports in the indentations, to cause the flexible products to flatten for stacking. Alternatively, mechanical friction means, such as eccentric wheels, drag the trailing edges of the product and urge them to flatten out.

In an alternative embodiment of the invention, the transfer drum includes a plurality of alternating first and second segments, where the first segments are movable transverse to the path of movement of the Products, that is, transverse to the direction of rotation of the transfer drum. The first segments are adapted to accept alternating flexible products from the product drum and include vacuum ports for securing the leading edges and mid-sections thereof. The second segments, which do not move transverse to the path of movement of the products, are adapted to accept alternating ones of the flexible products and also include vacuum ports for securing the leading edges and mid-sections thereof. The lateral shifting of the first segment of the transfer drum resolves problems associated with drastically different product drum and transfer drum surface speeds. Further, in the production of thermoplastic bags, by spreading out adjoining bags on the transfer drum, the shifting also Prevents rewelding of adjacent bag seals. Preferred in this alternative embodiment, the flexible products on the first segment are also secured at their trailing edges by vacuum ports in communication with the second vacuum manifold. Ultimately, the first segments of the transfer drum provide flexible products to a first delivery point, and the second segments provide flexible products to a second delivery point.

In the preferred embodiment of the invention, the means for transferring individual flexible products to a delivery point includes a plurality of rotatable vacuum transfer drums positioned about the periphery of the product drum for transferring individual products from each of the transfer points to a plurality of corresponding delivery points. The transfer means further include means for rotating those drums. At the delivery points, the products are stacked, counted, and packaged by machinery such as an orbital packaging apparatus. The drums are so arranged that the first of the transfer drums accepts individual products from the product drum at the first transfer point, while succeeding transfer drums accept products from the product drum at succeeding transfer points. Each transfer drum has indentations, cavity inserts and spacer blocks as described above.

At each transfer drum, at least a portion of the products on the product drum are transferred by means of a vacuum arrangement on the drums as described above. Vacuum sources in each drum communicate with vacuum ports which extend radially outwardly from the drums and retain the flexible products at their leading edges and midsections. By taking alternate ones of the flexible Products, the preferred embodiment assures that, in the production of thermoplastic bags, bags will not reweld to adjacent bag seals when flattening out on the transfer drum for delivery. The products on the transfer drum are then themselves delivered, by rotation of the drum, to a respective delivery point. The transfer drums are designed to remove individual products from the Product drum as it rotates so that as the last transfer drum is reached, all products have been transferred.

In conventional packaging systems, the maximum number of products which can be produced is limited by the capabilities of the packaging portion of the system. By providing a plurality of delivery points, the number of packaging apparatuses can be increased for a single product drum. This enables the product drum to be operated at much higher speeds. In this manner, the effective speed of the delivery system can be doubled or tripled without exceeding the design specifications of the packaging equipment. Additionally, where downtime and maintenance costs are excessive for packaging systems operated at the design limits of such systems, the preferred transfer and delivery system of the present invention permits increases in overall production rates while actually operating the packaging equipment at lower speeds than before.

The various transfer drum improvements may also find application with existing flexible product manufacturing apparatuses. For example in the production of thermoplastic bags, once bags are delivered to the transfer drum, for example, delivered flat from a smooth-surfaced product drum, the indentations on the transfer drum surface can provide a tuck in individual bags which will separate and prevent rewelding of adjacent bag seals; lateral shifting will spread out bags on the transfer drum to separate bag seals; and/or a plurality of transfer drums will separate bag seals and permit higher production rates.

Finally, a method for the continuous production of flexible products, such as plastic containers and bags made from a folded web of thermoplastic material, is provided. The method includes the steps of providing a source of a continuous web of the material, continuously feeding the web onto the surface of a rotating product drum, and tucking the web outwardly over fixed projections on the surface of the product drum, after which it is severed and sealed to form individual flexible products. A further aspect of the method is the transfer of the products to the surface of a rotating transfer drum having indentations in its surface mating with the projections on the product drum, following which the products are delivered to a delivery point. This further aspect of the method may also, separately, find application in transferring and delivering flexible products produced by existing methods.

Accordingly, it is an object of the present invention to provide an apparatus and method for varying the width of individual flexible products on a high volume production system. This, and other objects and advantages of the system will become apparent from the following detailed description, the accompanying drawings, and the appended claims.

BRIEF DESCRIPTION OF THE DRAWINGS

FIG. 6 is an alternative embodiment of the means for tucking of FIG. 5a;

DESCRIPTION OF THE PREFERRED EMBODIMENTS

Figure 1:
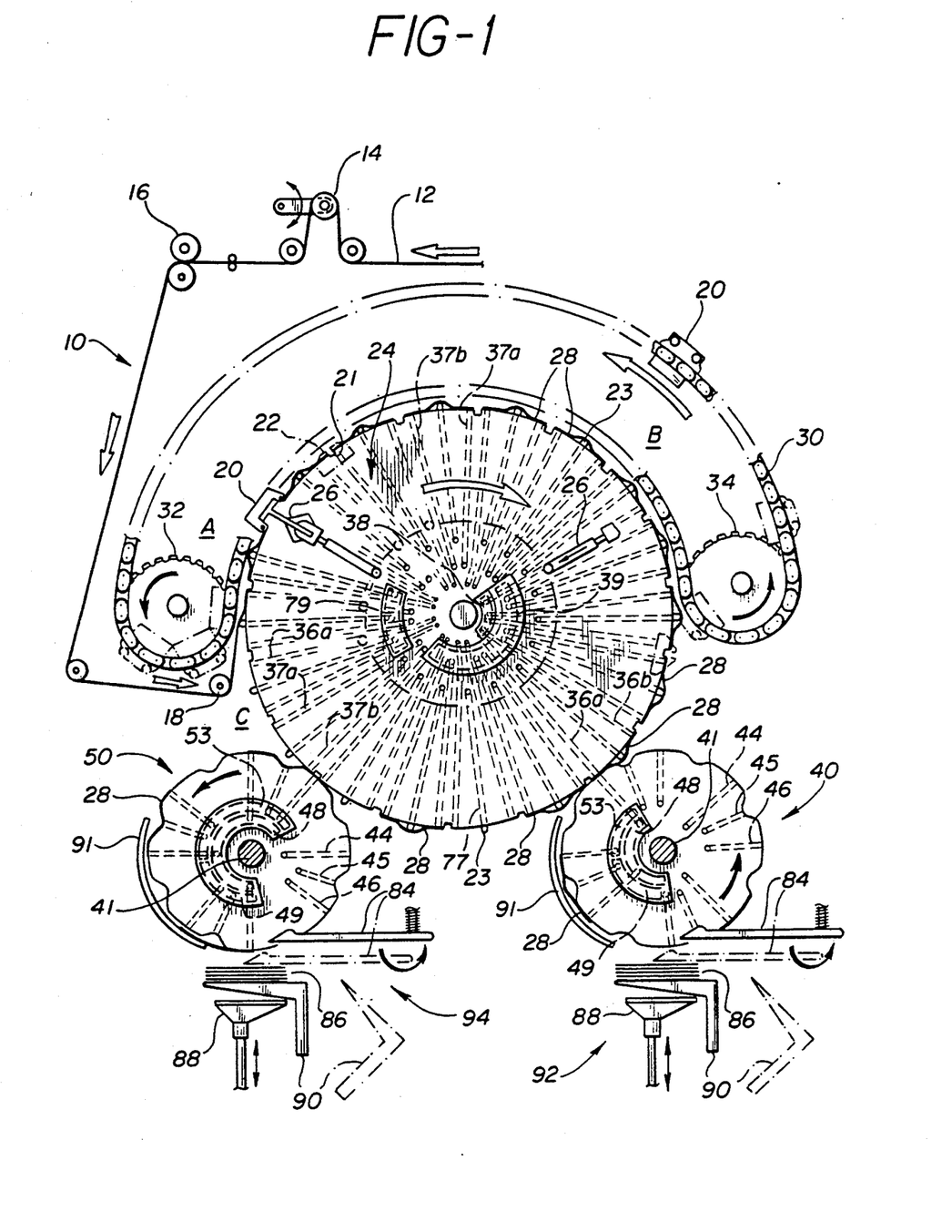
FIG. 1 is a schematic side elevational view of the preferred embodiment of the apparatus of the present invention.

Referring now to FIG. 1, the apparatus and method of the present invention is illustrated in schematic form in its multiple transfer drum delivery embodiment. Delivery system 10 receives a continuous film web 12 from a spool (not shown) or directly from an extrusion line. While the invention will be described in the context of a thermoplastic film web used to form individual bags or containers, it will be apparent to those skilled in the art that the apparatus and method of the present invention is applicable to other flexible products which are fed from a continuous web and then divided into individual products. For example, a variety of thin, flexible paper or plastic products such as paper napkins and towels may be produced and delivered to packaging equipment by the apparatus and method of the present invention.

Web 12 may either be a zippered or unzippered bag stock being folded on itself to provide a two ply film. Web 12 is caused to pass over dancer roll 14 which acts to control film web tension based on its vertical positioning. Web 12 is then pulled through a draw-roll arrangement 16 which is driven at a speed slightly in excess of the rotational speed of product drum 24. This type of operation permits some slack in the film as it is being fed onto Product drum 24. Drum 24 is designed to process two side-by-side plastic film webs simultaneously, although only a single web is shown. However, the invention is also applicable to a single stream of individual flexible products on the product drum. For ease of understanding, the invention will be explained with reference to a single stream of flexible products.

The web 12 then passes over a lay-on roll 18 which is located to position the film web against the seal bar assembly which then lays the web against the surface of the rotating product drum. If zippered film is being utilized, lay-on roll 18 will have a groove appropriately positioned thereon to accommodate and guide the zippered portion of the film web onto the product drum.

Web 12 is then severed and sealed on product drum 24 in the following manner. Web 12 is clamped tightly to the outer surface of product drum 24 between projections 23 at a severing and sealing edge of a heating element slot 21 by seal bar assembly 20. Seal bar assembly 20 is aligned in proper position through the use of yokes 22 on the product drum 24. Projections 23 are located between the seal bar assemblies. As product drum 24 rotates in the direction of the arrow, tension in the web 12 is first relieved by retracting expansion element 25 shown in FIG. 5. Then, a heated wire severing and sealing element, shown generally at 26 and operable through a conventional cam assembly (not shown) emerges from a recess in product drum 24 and severs web 12 at position A.

The severing and sealing element remains extended for approximately 120 degrees of rotation of the product drum until the severing and sealing element 26 is withdrawn a shown schematically at position B. During the time that the element is extended, the film melts back to the edge of the seal bar assembly 20 and a bead seal forms on the edge of the bag. Individual bags 28 are formed by the severing and sealing of the film web on adjacent seal bar assemblies. Expansion element 25 remains retracted until reaching position C where it is again extended prior to the contact with the web 12.

Just prior to the release of the clamping force of the seal bar assembly 20, a vacuum is applied to the leading and trailing edges of individual bags 28. Seal bar assembly 20 is removed from the product drum by a continuous chain drive 30 having sprockets 32 and 34 located on opposite sides of product drum 24. The chain drive permits precise positioning of the individual seal bar assemblies 20 along the surface of the product drum.

Figure 5:
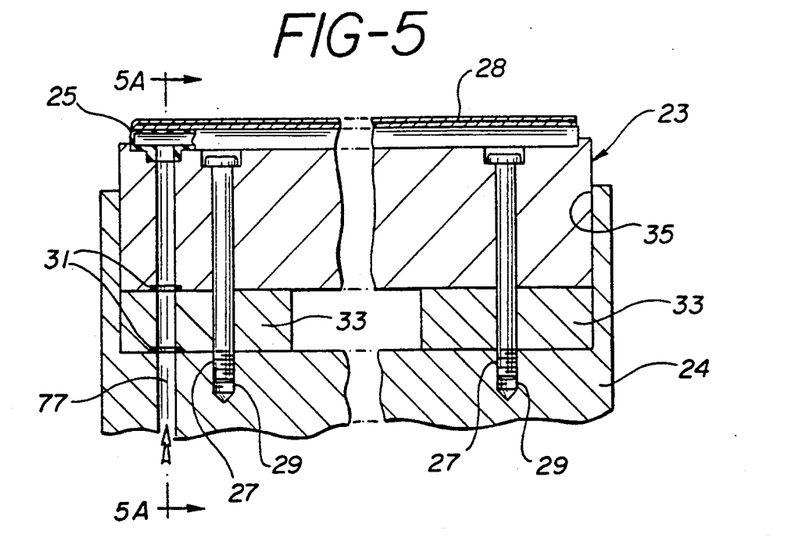
FIG. 5 is an enlarged cross-sectional view in cross-section of the preferred means for tucking taken along line 5—5 in FIG. 2.
Figure 5A:
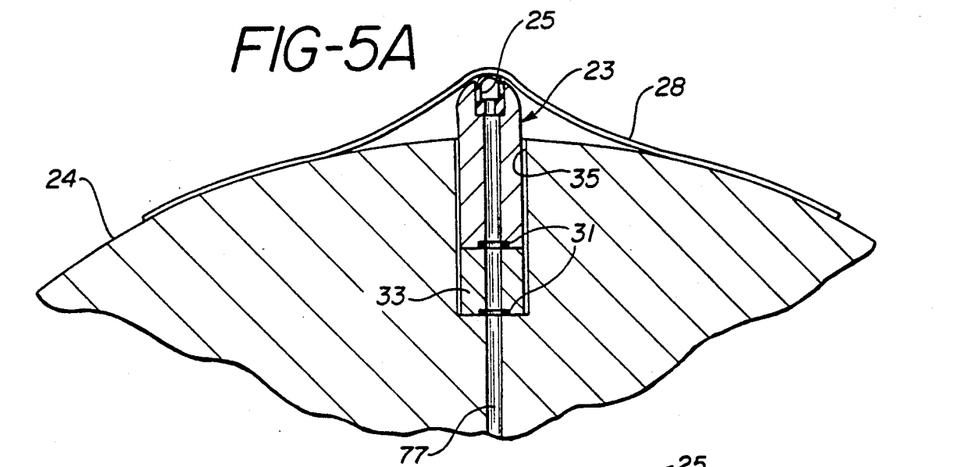
FIG. 5a is a cross-sectional view taken along line 5a–5a in FIG. 5.
Figure 6:
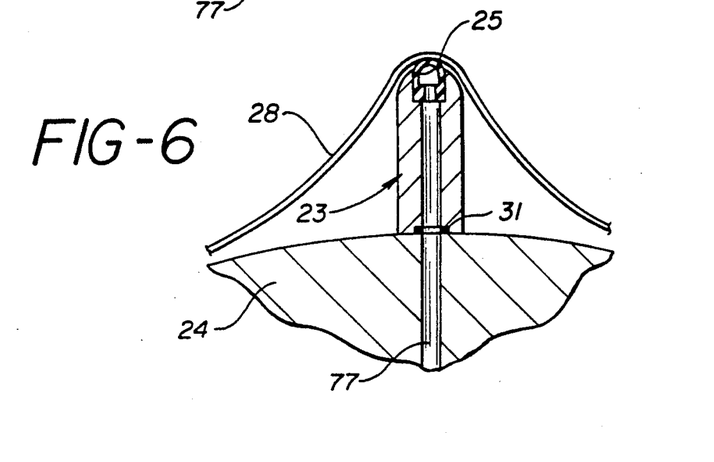
Figure 7:
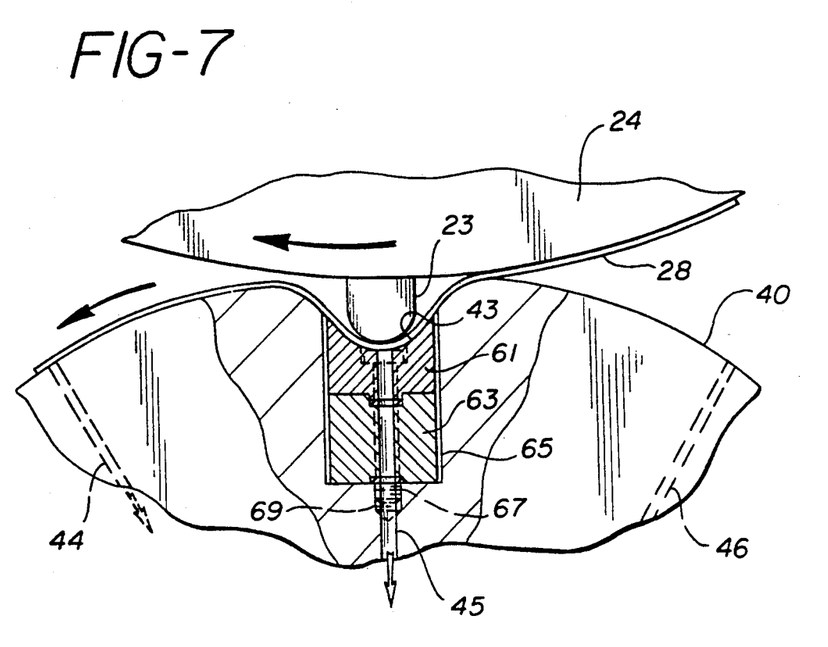
FIG. 7 is an enlarged view of the interface between the product drum and the transfer drum.
Figure 9:
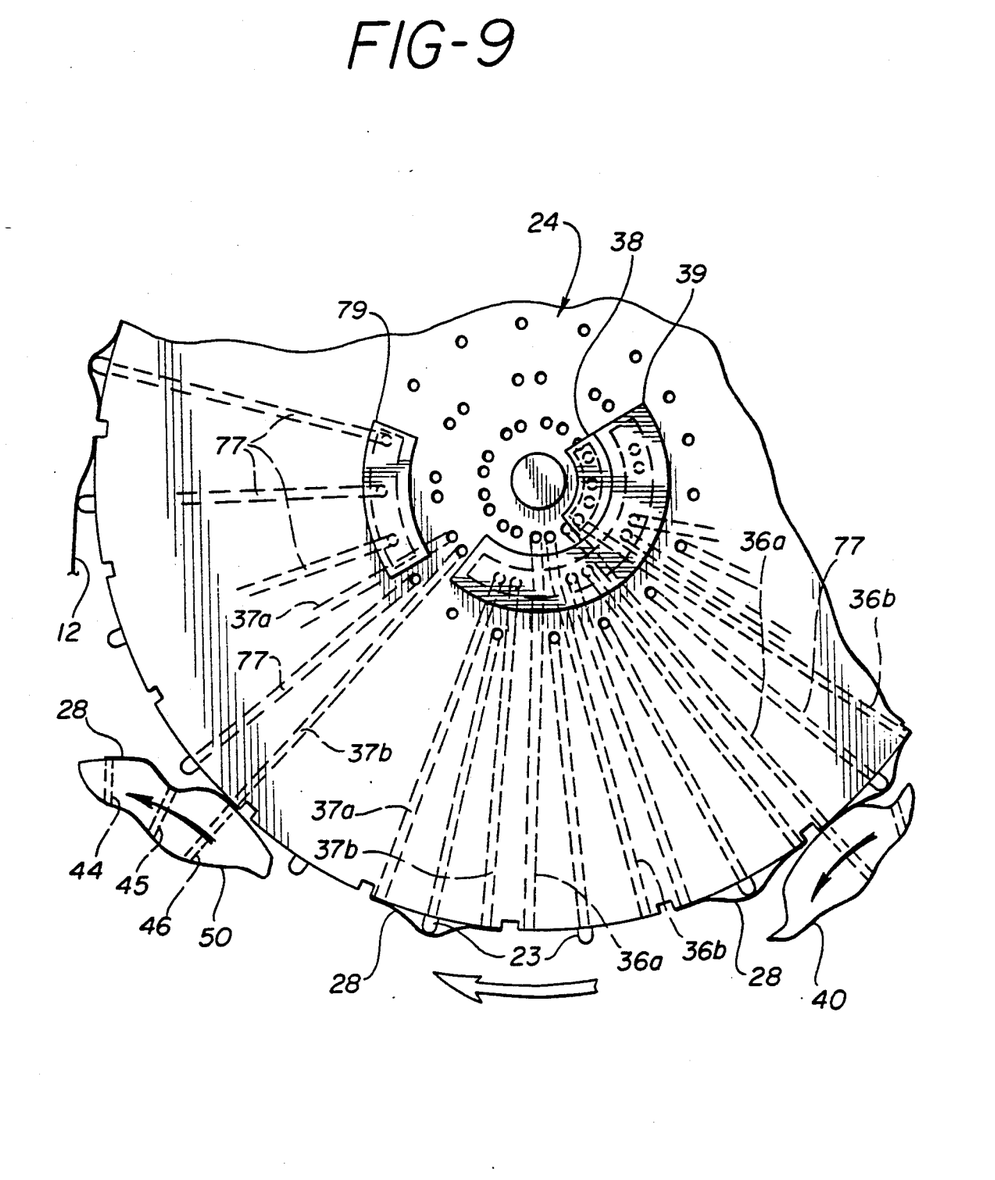
FIG. 9 is a schematic side view of the product drum showing vacuum and positive pressure manifolding.

Referring now to FIGS. 5 and 6, the structure and operation of the projections 23 on the product drum 24 are illustrated in greater detail. The projection 23 is attached to the surface of the drum 24 by conventional means, such as bolts 27 screwed into threaded holes 29 machined in the product drum 24. Tension relief in the film 12 is provided by mechanical means, such as an internal cam (not shown) or, preferably, pneumatic means shown in FIGS. 5 and 6. The pneumatic means consist of a rubber diaphragm 25 which communicates through ports 77 with a central manifold 79, shown in detail in FIG. 9. Central manifold 79 in turn communicates with a source of positive air pressure. As product drum 24 rotates, ports 77 are brought into and out of communication with manifold 79, causing the diaphragm to expand prior to web 12 being laid on drum 24, and then relieved to atmospheric pressure, providing tension relief for severing and sealing web 12. As shown in FIG. 5, O-ring joints 31 maintain air pressure from central manifold 79 to the diaphragm 25, and are included when spacer blocks 33 are used as shown in FIGS. 5 and 7.

Figure 2:
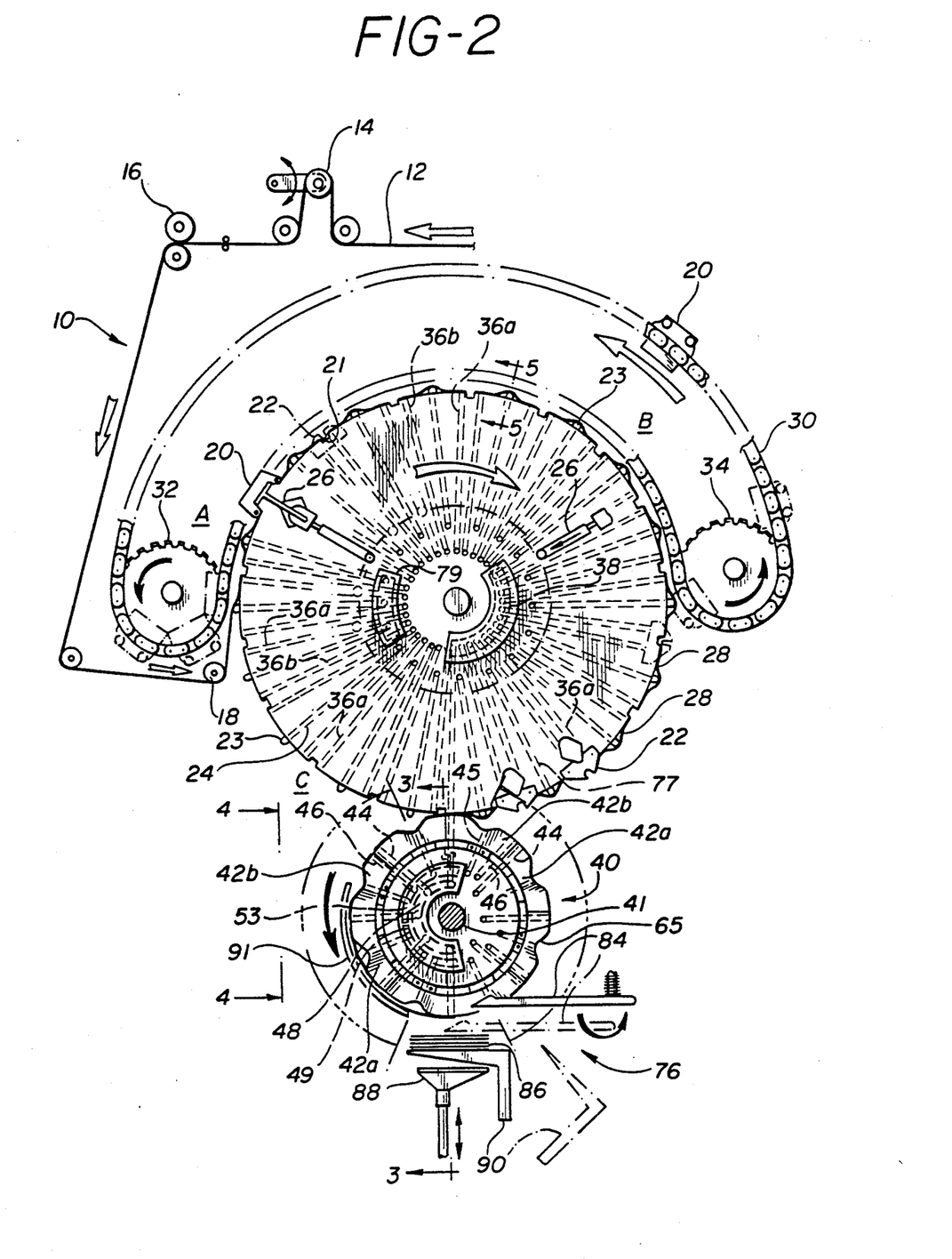
FIG. 2 is a schematic side elevational view of one embodiment of the apparatus of the present invention.

Conventional means for vacuum retention of the products are provided in the product and transfer drums. The embodiment of FIG. 2 shows individual bags 28 held in position on the rotating product drum 24 by vacuum ports 36a and 36b which communicate with a central manifold 38. Central manifold 38 in turn communicates with a vacuum source (not shown). As product drum 24 rotates, vacuum ports 36a and 36b are brought into and out of communication with manifold 38, causing a vacuum to be applied to the leading and trailing edges of bags 28 beginning at a point just prior to the removal of seal bar assembly 20 until just prior to transfer of the bags to transfer drum 40.

Figure 3:
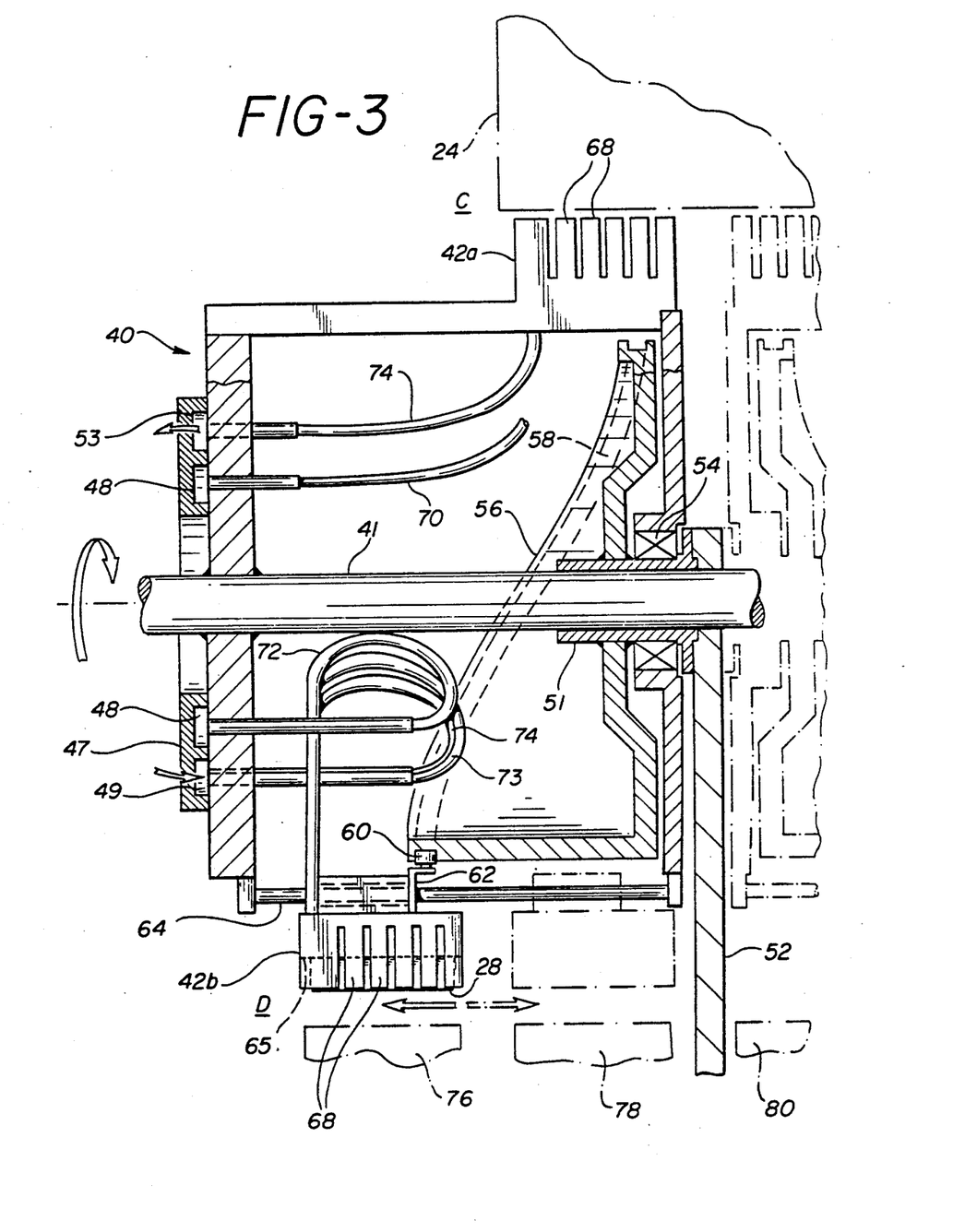
FIG. 3 is a cross-sectional view, taken along section line 3—3 in FIG. 2 illustrating one half of the transfer device of the present invention.
Figure 4:
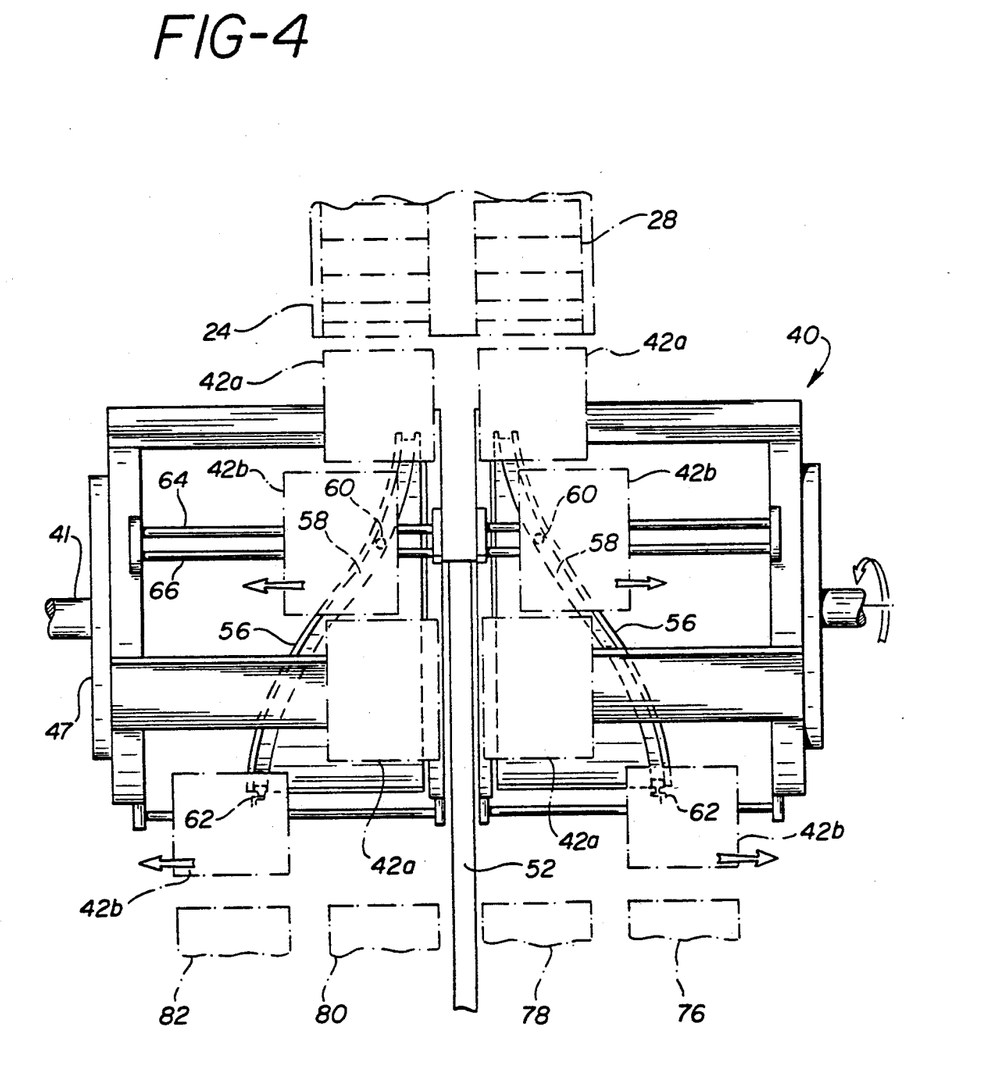
FIG. 4 is a side elevational view of the transfer device taken along line 4—4 in FIG. 2.

In the embodiment of FIG. 2, transfer drum 40 is driven by suitable drive means (not shown) through shaft 41. Alternatively, shaft 41 may be fixed, and transfer drum 40 rotated about the shaft. As shown in FIGS. 2 to 4, transfer drum 40 includes a plurality of segments 42a and 42b. It is preferable that segments 42a and 42b alternate about the periphery of the drum with segments 42a being fixed while segments 42b are movable transversely to the direction of rotation of drum 40. In an alternative embodiment, both segments 42a and 42b are fixed.

As shown in FIG. 2, a series of indentations 65 correspond in depth with projections 23 on the product drum 24, and mate with the projections as the product transfer drum rotates. The preferred embodiment of the indentations 65, illustrated in FIG. 7, shows that the indentations removably receive inserts 61 and spacer blocks 63, affixed by conventional means, such as bolts 67 screwed into threaded holes 69 machined into the product drums 40 and 50. Spacer blocks 63 permit positioning the inserts 61 to correspond in depth with projections 23 of different size which may be affixed to product drum 24. The indentations 65, inserts 61, and spacer blocks 63 include vacuum ports 45 communicating with the second vacuum manifold 53 shown in FIGS. 1 and 2 for securing the bags therein to prevent rewelding of adjacent bag seams.

With reference to the embodiment of FIG. 2, both fixed segments 42a and movable segments 42b include a first set of vacuum ports 44 in communication with a central manifold 48, and a second set of vacuum ports 45 in communication with a central manifold 53. Manifolds 48 and 53 are in turn in communication with a vacuum source (not shown). Both manifolds 48 and 53 as shown in FIGS. 3 and 4 are part of a housing 47 which is located on the side of drum 40. As shown in FIG. 2, vacuum ports 44 and 45 are positioned to secure the leading edges and mid-sections of each of the respective bags 28 as they are transferred to drum 40. The mid-sections are secured by vacuum to prevent rewelding of the bags with successive bags as the transfer drum rotates through a given arc. Preferably, the vacuum ports are arrayed across substantially the entire edge of the bags.

Segments 42b also include a second set of vacuum ports 46 which are also in communication with central manifold 53. Vacuum ports 46 are positioned to secure the trailing edges of bags 28 as they are transferred to drum 40. By securing both the leading edges, mid-sections, and trailing edges of bags 28 to the movable segments, wrinkling or folding of the bags is prevented during transverse movement of segments 42b.

While the vacuum ports 46 are shown as a preferred means for securing the trailing edges of bags 28, other suitable means may be employed to accomplish this function. For example, a single vacuum port located on one trailing corner of the bag may be sufficient to secure the trailing edge. Alternatively, vacuum ports may be positioned along a side edge of the bags. Finally, a static charge may be developed on the drum to hold down the trailing edges of the bags. A close-fitting guide 91 may be positioned just above the surface of the rotating transfer drum to urge the bags to flatten out or air jets or knives may be positioned to force a stream of air against the bags at an angle which will urge the bags out of the indentations and flatten them for delivery and stacking.

As further shown in FIG. 2, transfer drum 40 is positioned directly beneath product drum 24. This positioning provides operating advantages for the system. Because of the high rotational speeds of both drums (up to 500 feet per minute), the length of time available for the cam to side-shift movable segments 42b to their outermost position and then return them to their initial positions is quite short. By positioning transfer drum 40 directly beneath product drum 24, the arc length from the transfer point between the two drums to the pick-off point at the packing equipment is approximately equal to the return arc length. In this manner, the transverse movement of the cam will not exceed a critical angle of approximately 20°-25° along any point during the rotation of transfer drum 40. Transfer drum 40 may be positioned more to one side of product drum 24. However, the diameter of transfer drum 40 would need to be increased to provide a sufficient arc length to accommodate the transverse movement of the cam. The configuration shown in FIG. 2 is preferred as it permits the use of a transfer drum of minimum diameter and results in savings in materials costs.

Referring now to FIGS. 3 and 4, the structure and operation of the side-shifting transfer drum 40 are illustrated in greater detail. Drum 40 is mounted on drive shaft 41 which is in turn supported in a sleeve 51 secured to center support plate 52. Bearings 54 permit the rotation of drum 40 around fixed sleeve 51. For ease of explanation, only one half of transfer drum 40 is shown in FIG. 3. It will be appreciated that a mirror image of the portion of the drum which is illustrated extends from the opposite side of center support plate 52 as shown in FIG. 4 and is partially shown in phantom lines in FIG. 3.

Referring to FIG. 3, positioned within drum 40 is a cam 56 having a cam track 58. Cam 56 is secured to sleeve 51 by suitable means. A cam follower 60 secured to each movable segment 42b, such as by bracket 62, rides in cam track 58. Movable segments 42b are also mounted on bearings or the like for transverse movement on rails 64,66 (best shown in FIG. 3). Rotation of drum 40 about its longitudinal axis causes movable segments 42b to translate as shown along rails 64, 66 to move from position C, in alignment with bags from product drum 24 at the transfer point between the two drums, to position D, at the opposite side of transfer drum 40.

Both segments 42a and 42b have indentations 43 mating with projections 23 on the product drum. In a preferred form of the invention, fixed segments 42a have finger segments 68 with gaps therebetween to facilitate removal of the bags 28 by the orbital packing fingers on the orbital packing device as described in greater detail below. Flexible vacuum hose 70 supplies a source of vacuum from manifold 48 to vacuum ports 44 on the surface of segments 42a to secure the leading edges of bags 28 thereto.

Movable segments 42b also preferably include finger segments 68 having gaps therebetween. Flexible vacuum hoses 72, 73 and 74 provide a source of vacuum from manifolds 48, 53 and 53, respectively, to vacuum ports 44, 45 and 46 on the surface of the movable segments. In this manner, both the leading edge, mid-section, and trailing edge of bags 28 are secured to movable segments 42b.

In operation, pairs of bags 28 are transferred from continuous streams of bags on product drum 24 to transfer drum 40 as the two drums rotate in opposite directions. At the point of transfer, the vacuum on the leading edge of the bag on the product drum is released, and the bag falls onto transfer drum 40 where the leading edge is immediately secured by vacuum ports 44. It will be understood that for this embodiment of the invention that bags 28 will fall sequentially onto either a fixed segment 42a or movable segment 42b. As transfer drum 40 continues to rotate, vacuum port 45 will be activated to secure the mid-section of the bag, and if the bag is on a movable segment 42b, vacuum ports 46 will be activated to secure the trailing edge of the bag.

As shown in FIG. 4, as drum 40 rotates, both fixed and movable segments 42a and 42b are positioned directly beneath the transfer point on product drum 24. As drum 40 continues to rotate, movable segments 42b will begin to translate laterally as cam 56 causes cam follower 60 to move laterally in cam track 58. At a predetermined point in the rotation of drum 40, movable segments 42b are at their outwardmost position on drum 40, in alignment with packing devices 76 and 82, respectively. Fixed segments 42a continue to rotate in alignment with packing devices 78 and 80 respectively.

As illustrated in FIG. 2, the predetermined point at which movable segments 42b reach their outwardmost travel is approximately 180 degrees from the transfer point between drums 24 and 40. Cam 56 is designed so that after reaching the point of outermost travel and transferring the bags to the packing equipment, movable segments 42b begin to translate inwardly so that they are back into alignment with the streams of bags leaving product drum 24 by the time that drum 40 rotates them back to that position.

Figure 8:
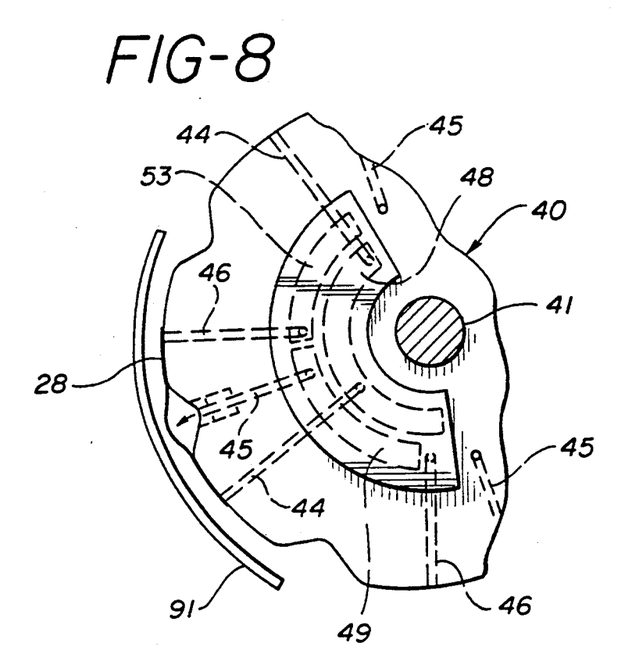
FIG. 8 is a schematic side view of the transfer drum showing vacuum and positive pressure manifolding.

In this manner, the two streams of individual bags shown in FIG. 4 may be divided into four streams which can then be delivered to separate packing devices 76, 78, 80, and 82. The operation of those packing devices are the same and will be described in greater detail in relation to device 76 as best shown in FIG. 2. Referring to FIG. 2, as bags 28 are brought around transfer drum 40, vacuum ports 44 retain the leading edges of the bags 28 until they reach a nearly horizontal position where the vacuum is released. Vacuum ports 45 and 46 hold onto the mid-sections and trailing edges of the bags 28 until they reach a generally vertical position at which time vacuum is released and a close-fitting guide 91 may contact the trailing edges of the bags to urge them from the indentations and flatten them out. The preferred embodiment also provides atmospheric or positive air pressure from manifold 49 to help urge the bags 28 from the indentations. Vacuum and Positive pressure manifolding of the transfer drum is shown schematically in FIG. 8.

In packing device 76 of FIG. 2, orbital packer fingers 84 pull the individual bags away from the drum surface and deposit the bags into a stack 86 on delivery table 88. At a precise time, count fingers 90 pivot between the position shown in Phantom lines completely out of the stream of bags into the position shown to separate the stack 86 of bags into the desired count. The delivery table 88 may be lowered to permit a clamp assembly (not shown) to clamp the stack of bags and transfer it to further conventional equipment for packaging the bags.

It will be apparent, however, that the cam and movable segments may be designed to translate the segments so that the transfer point between drum 40 and the packing devices occurs at some other point during rotation of drum 40. Additionally, while the invention has been described with reference to a system which divides two streams of products into four streams, it will be apparent that other cam arrangements may be designed to produce additional lanes or streams of products for delivery to corresponding packing equipment. For example, the transfer drum may be constructed so that every other pair of products is side-shifted in opposite directions so that a first pair is side-shifted at least one product width to one side while a succeeding product pair is then side-shifted at least one product width to the opposite side. Alternatively, a dual station transfer drum similar to the embodiment illustrated may be designed so that movable drum segments on one side of the drum are aligned with nonmovable segments on the other side. Other arrangements are also possible and within the scope of the invention.

In the preferred embodiment of the invention illustrated in FIG. 1, where like reference numerals represent like elements, first and second transfer drums 40 and 50, respectively, are positioned at different transfer points around the periphery of product drum 24. As shown in this embodiment, product drum 24 is equipped with a first set of vacuum ports 36a and 36b as well as a second set of ports 37a and 37b. Each set of ports communicates with a respective central manifold 38, 39. With the product and transfer drums rotating in the directions indicated by the arrows, it can be seen that the vacuum on ports 36a and 36b is released at a point approximately along the centerline between the product drum 24 and first transfer drum 40.

Bags 28 transferred to first transfer drum 40 are then delivered to packing device 92 for stacking and counting as previously described. That portion of the bags which are held by ports 37a and 37b are carried with product drum 24 until the vacuum is released at a point approximately along the centerline between product drum 24 and second transfer drum 50. Again, bags which are released to second transfer drum 50 are then delivered to packing device 94 for stacking and counting. Vacuum retention and release, and delivery of bags by the product drum for packing is accomplished in the same manner as detailed above in the alternative embodiment of FIG. 2.

As will be recognized by those skilled in the art, modifications to the embodiments illustrated in FIGS. 1 and 2 can be made. For example, the FIG. 1 embodiment can be arranged to have a third and/or fourth transfer drum. The vacuum ports on the product drum and each of the transfer drums can be arranged so that a portion of the individual bags are delivered to each transfer drum, and from there to corresponding packaging devices. Such arrangements will be effective to triple or quadruple the production rate from the system without increasing the rate of operation of any of the individual packaging devices.

Further, the various embodiments of the transfer drum are recognized as adaptable for use with product drums of conventional design to prevent rewelding of adjacent bag seals. The indentations can provide a tuck in individual bags delivered flat from the product drum; lateral shifting will spread out bags on the transfer drum; and a plurality of transfer drums will separate alternate bags.

It can also be seen that different width bags may be produced on the product drum, with every other bag being of an alternating width. For example, the spacing between adjacent sever and seal stations on the product drum may be changed so that the spacing corresponds to such alternating widths. Of course, the vacuum ports on both the product drum and first transfer drum would be changed to correspond to the new spacing arrangement. The alternating width bags may then be sent to the transfer drums where bags of each specific width are delivered to a separate packaging device. In this manner, the different width (and thus, volume) bags are separately packed and packaged for use.

While certain representative embodiments and details have been shown for purposes of illustrating the invention, it will be apparent to those skilled in the art that various changes in the methods and apparatus disclosed herein may be made without departing from the scope of the invention, which is defined in the appended claims. In particular, while the apparatus has been described in terms of a product drum with projections and transfer drum with indentations, it will be apparent to those skilled in the art that the apparatus could be designed conversely, with indentations on the product drum and projections on the transfer drum.

What is claimed is:

1. An apparatus for the continuous transfer and delivery of individual flexible products from a product drum to a delivery point comprising:
   means for providing a series of individual flexible products to a transfer point;
   means for transferring said products from said transfer point to a delivery point,
   said transfer means including a rotatable vacuum transfer drum, means for rotating said vacuum transfer drum and a vacuum source,
   said vacuum source including first and second manifolds communicating therewith,
   said vacuum transfer drum adapted to accept said products from said product drum and including vacuum ports in communication with said first manifold for securing the leading edges of said products, and
   said vacuum transfer drum further having a series of indentations on the surface thereof, said indentations further including vacuum ports communicating with said second manifold for securing said flexible products in said indentations.

2. An apparatus as recited in claim 1 further comprising means for urging said flexible products outwardly from said indentations prior to said products reaching said delivery point.

3. An apparatus as recited in claim 2 wherein said transfer means includes a positive air pressure manifold, and
   said means for urging said flexible products outwardly comprises positive air pressure communicated from said positive air pressure manifold to said products by said ports in said indentations.

4. An apparatus as recited in claim 1 wherein a close-fitting guide positioned adjacent to the surface of said transfer drum urges said flexible products to flatten outwardly as vacuum is released from the mid-section of said products.

5. .The apparatus of claim 1 which includes means located at said delivery point for removing individual products from said transfer drum.

6. The transfer and delivery apparatus of claim 1 in which said transfer drum includes a plurality of alternating first and second segments for delivery of individual flexible products to a plurality of delivery points,
   said first segments being movable transverse to the path of movement of said products, said first segments adapted to accept alternating ones of said products from said product drum,
   said second segments adapted to accept alternating ones of said products, and
   means for moving said first segments transverse to said path of movement of said products, whereby said first segments provide individual products to a first delivery point and said second segments provide individual products to a second delivery point.

7. The transfer and delivery apparatus of claim 1 which includes means located at said delivery point for removing products from said transfer drum.

8. The transfer and delivery apparatus of claim 6 in which said second manifold communicates with the trailing edge vacuum ports on said first segment during the period in which said first segments are being moved transversely.

9. The transfer and delivery apparatus of claim 6 in which said second segments include vacuum ports in communication with said second manifold for securing the trailing edges of said products.

10. The transfer and delivery apparatus of claim 6 which includes means located at each of said delivery points for removing said individual products from each of said segments of said transfer drum.

11. An apparatus for the continuous transfer and delivery of individual flexible products from a product from to a delivery point comprising:
  means for providing a series of individual flexible products to a transfer point;
  means for transferring said products from said transfer point to a delivery point,
  said transfer means including a rotatable vacuum transfer drum, means for rotating said vacuum transfer drum and a vacuum source,
  said vacuum source including first and second manifolds communicating therewith,
  said vacuum transfer drum adapted to accept said products from said product drum and including vacuum ports in communication with said first manifold for securing the leading edges of said products, and
  said vacuum transfer drum further having a series of indentations on the surface thereof, said indentations further including vacuum ports communicating with said second manifold for securing said flexible products in said indentations;
  means to vary the depth of said indentations,
  said means of variation including means for removably receiving inserts and spacer blocks of different discrete sizes, and
  said indentations, inserts and spacer blocks including ports communicating with said second vacuum manifold.

12. An apparatus for the continuous transfer and delivery of individual flexible products from a plurality of transfer points on a rotatable vacuum product drum to a plurality of delivery points comprising:
  means for providing a series of individual flexible products sequentially to a plurality of individual flexible products sequentially to a plurality of transfer points,
  means for transferring individual ones of said products from each of said plurality of transfer points to a delivery point,
  said transfer means including a plurality of vacuum transfer drums, means for rotating said vacuum transfer drums and a vacuum source,
  said transfer drums arranged such that the first of said plurality of transfer drums accept individual products from said vacuum product drum at a first transfer point and each succeeding transfer drum accepts individual products from said vacuum product drum at each succeeding transfer point, said first transfer drum delivering at least a portion of said individual products to a first delivery point, and each succeeding transfer drum located at each succeeding transfer point delivering at least a portion of said individual products to succeeding delivery points,
  said vacuum transfer drums further having a series of indentations on the surface thereof for receiving a portion of said products.

13. An apparatus as recited in claim 12 wherein a close-fitting guide positioned adjacent to the surface of each of said transfer drums urges said flexible products to flatten outwardly.

14. An apparatus as recited in claim 12 which includes means located at each of said delivery points for removing individual flexible products from each of said transfer drums.

15. The apparatus of claim 12 wherein the means by which the vacuum transfer drums accept individual products include vacuum ports in communication with said vacuum manifold for securing the leading edges of said products.

16. The apparatus of claim 12 wherein said vacuum source includes first and second manifolds, and
  said vacuum transfer drum includes vacuum ports in communication with said first manifold for securing the leading edges of said products, and said indentations further including vacuum ports communicating with said second manifold for securing said products in said indentations, and
  means for urging said flexible products outwardly from said indentations prior to said products reaching said delivery point.

17. An apparatus as recited in claim 16 in which said indentations, inserts, and spacer blocks include ports communicating with said second vacuum manifold.

18. An apparatus as recited in claim 16 wherein said transfer means includes a positive air pressure manifold, and
  said means for urging said flexible products outward comprises positive air pressure communicated from said positive air pressure manifold to said products by said ports in said indentations.

19. An apparatus for the continuous transfer and delivery of individual flexible products from a plurality of transfer points on a rotatable vacuum product drum to a plurality of transfer points comprising:
  means for providing a series of individual flexible products sequentially to a plurality of transfer points,
  means for transferring individual ones of said products from each of said plurality of transfer points to a delivery point,
  said transfer means including a plurality of vacuum transfer drums, means for rotating said vacuum transfer drums and a vacuum source,
  said transfer drums arranged such that the first of said plurality of transfer drums accept individual products from said vacuum product drum at a first transfer point and each succeeding transfer drum accepts individual products from said vacuum product drum at each succeeding transfer point, said first transfer drum delivering at least a portion of said individual products to a first delivery point, and each succeeding transfer drum located at each succeeding transfer point delivering at least a portion of said individual products to succeeding delivery points,
  said vacuum transfer drums further having a series of indentations on the surface thereof for receiving a portion of said products,
  means to vary the depth of said indentations on said transfer drums,
  said means of variation including means for removably receiving inserts and spacer blocks of different discrete sizes.

20. A method for delivery of continuously produced individual flexible products comprising the steps of:
  providing a continuous source of individual flexible products;
  continuously transferring said products to the surface of a rotating transfer drum having indentations in the surface thereof for receiving a portion of said products;
  securing said products in said indentations by applying a vacuum thereto and, thereafter
  delivering said products to a delivery point.

21. A method as claimed in claim 20 further comprising the step of:

urging said flexible products outwardly from said indentations as said transfer drum rotates by the application of atmospheric or positive air pressure prior to delivering said products to said delivery point.

22. A method for delivery of continuously produced individual flexible products comprising the steps of:

providing a continuous source of individual flexible products to a plurality of transfer points, and continuously conveying said products sequentially to a plurality of transfer points, and transferring individual ones of said products from each of said plurality of transfer points to one of a plurality of transfer drums there located, each of said transfer drums having indentations in the surfaces thereof for receiving a portion of said products; and, thereafter, delivering said products from each of said plurality of transfer drums to related delivery points.

23. A method as claimed in claim 22 further comprising the step of:

urging said flexible products outwardly from said indentations as said transfer drum rotates prior to delivering said products to said related delivery points.

* * * * *

UNITED STATES PATENT AND TRADEMARK OFFICE
CERTIFICATE OF CORRECTION

PATENT NO. : 5,108,085
DATED : April 28, 1992
INVENTOR(S) : David A. Smith et al It is certified that error appears in the above-indentified patent and that said Letters Patent is hereby corrected as shown below:

Title Page, line 11 of Abstract, following "width" insert --without --.

Claim 12, column 13, line 35-36, following "plurality" delete "of individual flexible products sequentially to a plurality"

Signed and Sealed this

Twenty-fourth Day of August, 1993

Attest:

BRUCE LEHMAN

*Attesting Officer*     *Commissioner of Patents and Trademarks*